(12) United States Patent
Conigliaro et al.

(10) Patent No.: US 12,391,115 B2
(45) Date of Patent: Aug. 19, 2025

(54) MOTOR VEHICLE AND METHOD FOR THE RECONFIGURATION OF A PASSENGER COMPARTMENT OF THE MOTOR VEHICLE

(71) Applicant: FERRARI S.P.A., Modena (IT)

(72) Inventors: Vito Conigliaro, Modena (IT); Thierry Annequin-Digond, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/591,602

(22) Filed: Feb. 29, 2024

(65) Prior Publication Data
US 2024/0294067 A1     Sep. 5, 2024

(30) Foreign Application Priority Data

Mar. 3, 2023 (IT) ........................ 102023000003843

(51) Int. Cl.
*B60K 26/02* (2006.01)
*B60T 7/06* (2006.01)

(52) U.S. Cl.
CPC ............... *B60K 26/02* (2013.01); *B60T 7/06* (2013.01); *B60K 2026/026* (2013.01); *B60Y 2400/412* (2013.01)

(58) Field of Classification Search
CPC ............. B60K 2026/024; B60K 26/02; B60K 2026/026; G05G 1/405; G05G 1/40; G05G 1/36; B60T 7/06
See application file for complete search history.

(56) References Cited

U.S. PATENT DOCUMENTS

| 5,218,920 A | 6/1993 | Kobayashi |
| 6,364,047 B1 * | 4/2002 | Bortolon ............... B60K 26/02 |
| | | 74/513 |

(Continued)

FOREIGN PATENT DOCUMENTS

| CN | 107521548 A * 12/2017 | ............. B62D 1/181 |
| DE | 102005005511 A1 * 8/2006 | ............. B60N 2/062 |

(Continued)

OTHER PUBLICATIONS

Italian Search Report in IT Application No. 202300003843, mailed Sep. 14, 2023, an English Translation attached hereto (7 pages).

*Primary Examiner* — Thomas C Diaz
(74) *Attorney, Agent, or Firm* — Leason Ellis LLP (57) ABSTRACT

A motor vehicle is described, which comprises: a passenger compartment; a plurality of driving members, which are housed inside the passenger compartment and can be operated by a driver in order to control the trajectory and the speed of the motor vehicle; at least one control member connected to one of the driving members through a drive by wire mode; the motor vehicle is selectively available in a first configuration, wherein the passenger compartment defines a first seat for a driver facing the control member and a second seat for a passenger beside the first seat along an axis; and a second configuration, wherein the passenger compartment only defines a third seat for a driver; the first seat being arranged, in the first configuration, in a first position and the third seat being arranged, in the second configuration, in a second position spaced apart from the first position along the axis; the driving member can be moved along the axis to enable the transformation of the motor vehicle between said first and second configurations.

4 Claims, 6 Drawing Sheets

(56) References Cited

U.S. PATENT DOCUMENTS

| | | | | |
|---|---|---|---|---|
| 6,431,304 B1* | 8/2002 | Smythe | ............. | G05G 1/405 |
| | | | | 74/513 |
| 6,450,061 B1* | 9/2002 | Chapman | ............. | G05G 1/405 |
| | | | | 74/513 |
| 11,110,821 B2* | 9/2021 | Luchner | ............. | B60K 37/00 |
| 11,597,359 B1* | 3/2023 | Kim | ............. | B60T 7/065 |
| 2020/0254906 A1 | 8/2020 | Luchner et al. | | |
| 2021/0078625 A1* | 3/2021 | Yamazaki | ............. | B62D 1/10 |

FOREIGN PATENT DOCUMENTS

| | | | | |
|---|---|---|---|---|
| EP | 1571064 A1 * | 9/2005 | ............. | B60T 7/06 |
| EP | 3712035 A2 | 9/2020 | | |
| GB | 2598584 A * | 3/2022 | ............. | B62D 1/183 |

\* cited by examiner

MOTOR VEHICLE AND METHOD FOR THE RECONFIGURATION OF A PASSENGER COMPARTMENT OF THE MOTOR VEHICLE

CROSS-REFERENCE TO RELATED APPLICATIONS

This patent application claims priority from Italian patent application no. 102023000003843 filed on Mar. 3, 2023, the entire disclosure of which is incorporated herein by reference.

TECHNICAL FIELD

The present invention relates to a motor vehicle and a method for the reconfiguration of a passenger compartment of the motor vehicle.

BACKGROUND

As is known, motor vehicles comprise:
a passenger compartment defining a body;
a plurality of wheels;
a steering wheel arranged inside the passenger compartment and operable by a driver to steer the front wheels and therefore allow the vehicle to travel a curved trajectory; and
a set of pedals comprising an accelerator and a brake which can be operated by the driver to increase the driving torque or to exert a braking torque, respectively, on the wheels in order to control the speed of the motor vehicle.

Passenger compartments of motor vehicles normally intended for road use have the so-called 'two-seater' configuration.

In this 'two-seater' configuration, the passenger compartment comprises a pair of front seats intended to be occupied by a driver and a passenger, respectively, and arranged side-by-side along a transverse direction of the motor vehicle orthogonal to a longitudinal direction defining a normal driving direction of the motor vehicle.

The steering wheel and set of pedals are located in front of the driver's seat and substantially at a front left or right corner of the motor vehicle.

With particular reference to sports cars, passenger compartments are known to have the so-called 'single-seater' configuration.

In this 'single-seater' configuration, the passenger compartment comprises a single front seat positioned centrally in front of the steering wheel and the set of pedals.

There is a need in the field for motor vehicles which allow easy and convenient reconfiguration between the above-mentioned 'single-seater' and 'two-seater' configurations.

EP-A-3712035 discloses a steering assembly for a motor vehicle, in which a steering wheel can be moved to multiple positions for manual operation, in both manufacturing and use contexts.

SUMMARY

The object of the present invention is to provide a motor vehicle which allows the above-mentioned need to be met.

Said object is achieved by the present invention, insofar as it relates to a motor vehicle as defined in the appended claims.

The present invention also relates to a method for the reconfiguration of a passenger compartment of the motor vehicle as described herein.

BRIEF DESCRIPTION OF THE DRAWINGS

In order to better understand the present invention, a non-limiting preferred embodiment thereof will now be described by way of example with reference to the accompanying drawings, in which.

DESCRIPTION OF EMBODIMENTS

Figure 1:
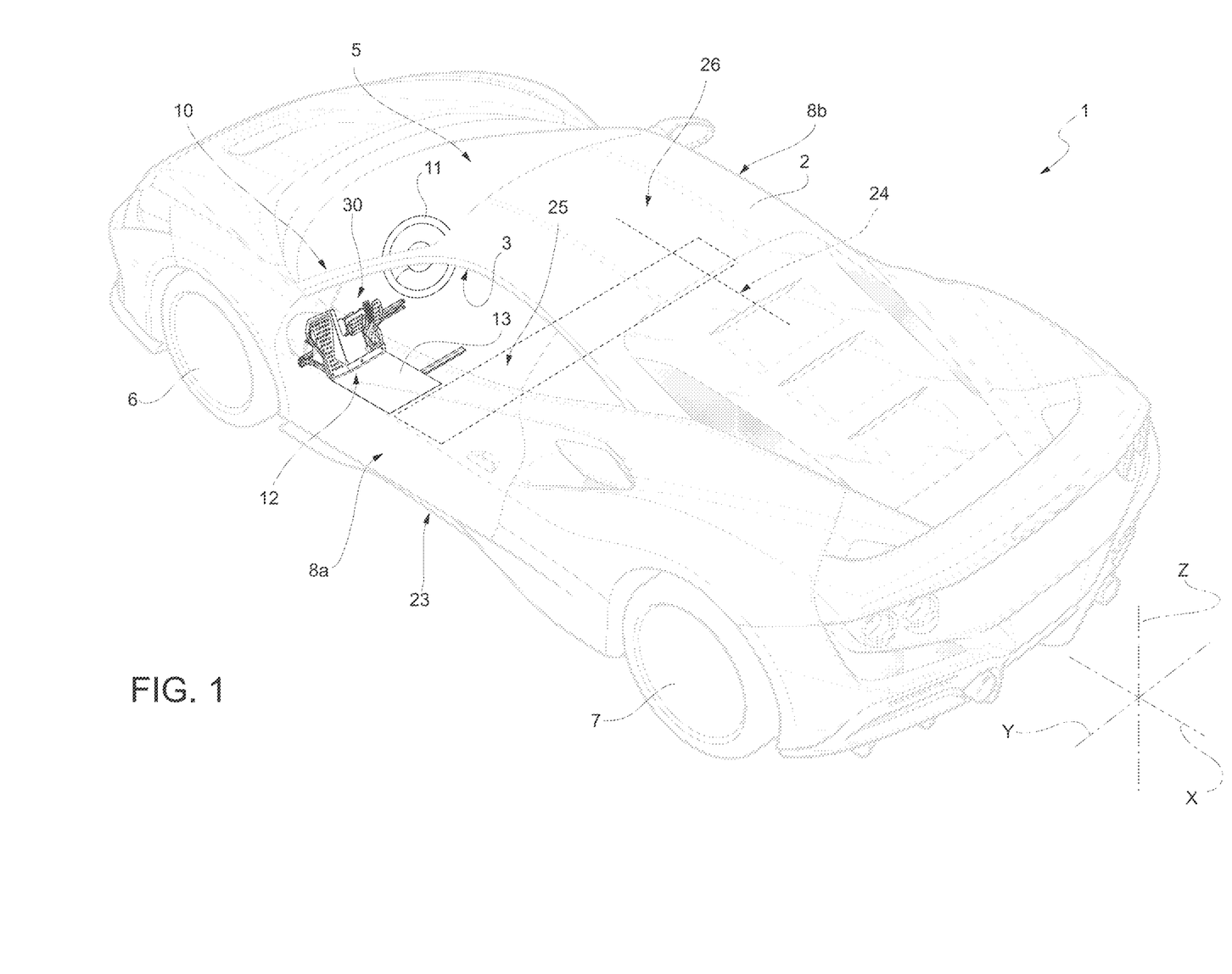
FIG. 1 is a perspective view of a motor vehicle made according to the teachings of the present invention, with parts removed for clarity.

With reference to FIG. 1, the numeral 1 indicates a motor vehicle comprising a body 2 defining a passenger compartment 3.

It should be specified that, below in this description, expressions such as "above", "below", "in front of", "behind" and the like are used with reference to the normal movement of the motor vehicle 1.

Figure 6:
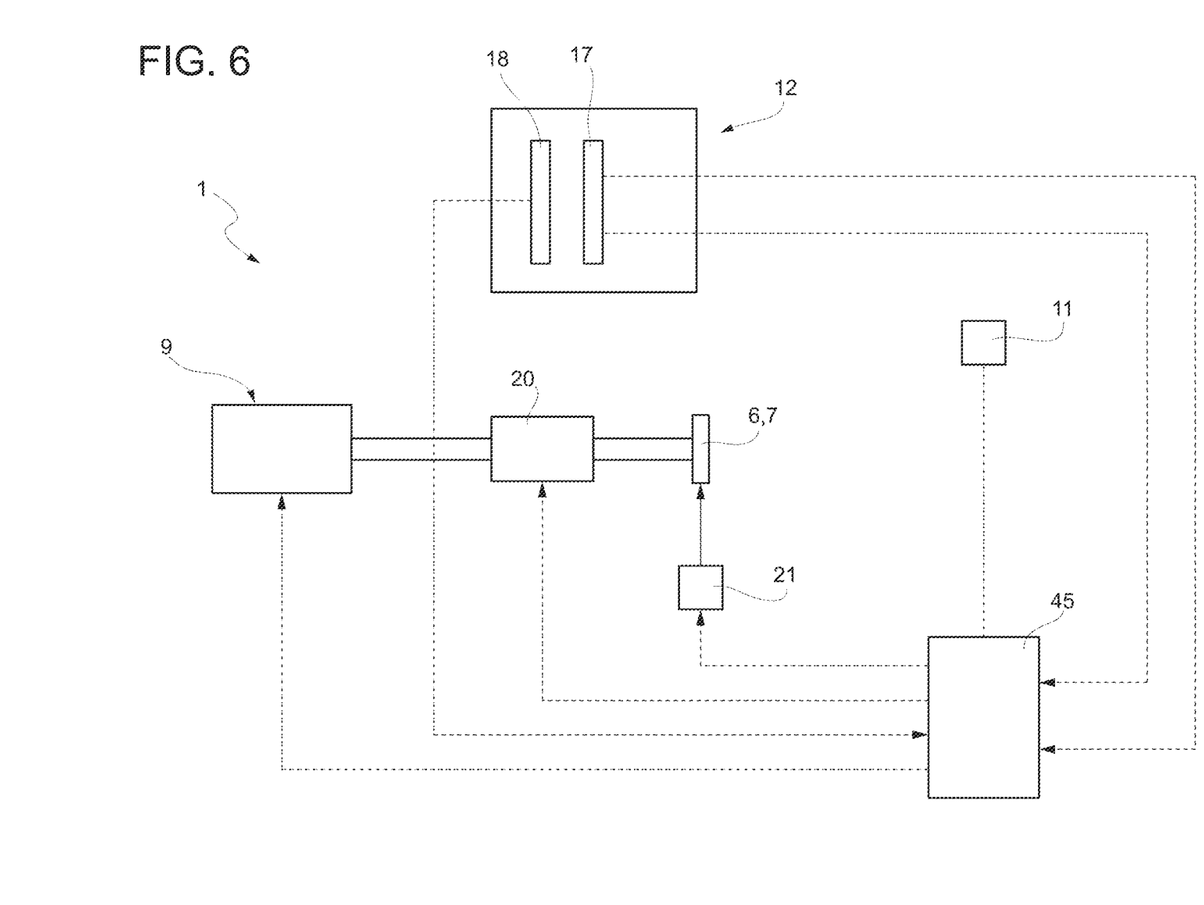
FIG. 6 is a functional diagram of some components of the motor vehicle shown in FIGS. 1 to 5.

The motor vehicle 1 further comprises (FIG. 6):
one pair of front wheels 6 and one pair of rear wheels 7;
an engine 9 of a known type, not shown in detail and operatively connected to the wheels 6 and/or 7 to exert a driving torque on the wheels 6 and/or 7;
a gearbox 20 interposed between the engine 9 and the wheels 6 and/or 7, which can be operated to vary the transmission ratio between an output member of the engine 9 and the wheels 6, 7; and
a braking system 21 which can be operated to exert a braking torque on the wheels 6, 7.

The motor vehicle 1 further comprises (FIG. 1):
a windscreen 5 delimiting the passenger compartment 3 at the front;
a backrest (not shown) delimiting the passenger compartment 3 at the rear;
a roof 26 delimiting the passenger compartment 3 at the top; and
a pair of doors 8a, 8b hinged to the body 2 and movable between a closed position, in which they delimit the passenger compartment 3 at the sides and prevent entry into/exit from the passenger compartment 3, and an open position, in which they allow entry into/exit from the passenger compartment 3.

It is also possible to define:
a longitudinal axis X integral with the motor vehicle 1, arranged, in use, horizontal and parallel to a normal forward moving direction of the motor vehicle 1;
a transversal axis Y integral with the motor vehicle 1, arranged, in use, horizontal and orthogonal to the axis X; and
an axis Z integral with the motor vehicle 1, arranged, in use, vertical and orthogonal to the axes X, Y.

The body 2 also comprises a pair of longitudinal, end door sills 23, 24, opposite each other. The door sills 23, 24 delimit the passenger compartment 3 and are adjacent to respective doors 8a, 8b when the doors 8a, 8b are in their closed positions.

In addition, the motor vehicle 1 comprises control members 10 arranged in the passenger compartment 2 which can be operated by the driver to set a forward trajectory of the motor vehicle 1 at a desired speed.

As is well known, the control members 10 comprise:
a steering wheel 11 arranged inside the passenger compartment 2 and operable by the driver; and
a set of pedals 12 also arranged inside the passenger compartment 2 and operable by the driver.

The set of pedals 12, in turn, comprises (FIGS. 2 to 5):
a support base 13 fixed to the body 2 and having two edges 14a, 14b opposite each other and parallel to the axis Y, and two edges 15a, 15b opposite each other, parallel to the axis Y and interposed between the edges 14a, 14b;
an accelerator pedal 17 protruding outwards from the base 13 and operable from a released position to a full stroke position 16 in order to adjust the value of the driving torque generated by the engine 9; and
a brake pedal 18 also protruding from the base 13 and operable to exert an adjustable braking torque value generated by the braking system 21 on the wheels 6 and/or 7.

In particular, the base 13 defines a rectangular area 31 delimited at the rear by the edge 14b, at the front by an edge 32 parallel to the axis Y, and at the sides by a pair of portions of respective edges 15a, 15b extending between the edges 14b and 32.

The edge 32 is interposed along the axis X between the edges 14a, 14b.

In the case illustrated herein, the accelerator pedal 17 and the brake pedal 18 protrude cantilevered from the edge 32 of the base 13 upwards and into the passenger compartment 3.

If the engine 9 is an electric engine, the gearbox 20 and the clutch pedal are not present.

If the gearbox 20 is semi-automatic or automatic, the clutch pedal is not present.

The control members 10 are connected to the engine and wheels 6 and/or 7 through a drive-by-wire mode, thus producing a technology known in the industry as 'drive by wire'.

The term 'drive by wire' in the present description is intended to mean that the steering wheel 11 has no physical or mechanical connection to the wheels 6, 7.

Similarly, the accelerator pedal 17 has no physical or mechanical connection to the engine 9, and the brake pedal 18 has no mechanical connection to the braking system 21.

The motor vehicle 1 also comprises a control unit 45 (FIG. 6) programmed to receive, as input, the operations requested from the steering wheel 11 and set of pedals 12 and to generate, as output, appropriate control signals for the engine 9 and the braking system 21.

The passenger compartment 3 further comprises a front location 25 which defines a driver's seat.

The location 25 is only schematically shown in FIG. 1.

The passenger compartment 3 of the motor vehicle 1 is selectively movable, in a manner not described in detail because it is not necessary for the understanding of the present invention, between:
a 'two-seater' configuration, in which the location 25 defines a first seat for a driver and a second seat for a passenger arranged side-by-side along the axis Y; and
a 'single-seater' configuration, in which the location 25 defines a single third seat for the driver.

In the 'two-seater' configuration, the first seat is beside the door sill 23 and the second seat is beside the door sill 24, thus achieving a left-hand driving mode of the motor vehicle 1. In addition, the first seat faces the steering wheel 11 and the set of pedals 12 to allow the driver to operate the steering wheel 11 and the set of pedals 12.

In this 'single-seater' configuration, the third seat is arranged in a central position between the door sills 23, 24 and faces the steering wheel 11 and the set of pedals 12.

Advantageously, the set of pedals 12 can be moved along the axis Y to enable the transformation of the motor vehicle 1 between the first and the second configuration.

In this way, the set of pedals 12 can be moved parallel to the axis Y between:
a first position (FIGS. 1, 2 and 4) taken on when the passenger compartment 3 is in the first configuration, facing the first seat defined by the location 25;
a second position (FIGS. 3 and 5) taken on when the passenger compartment 3 is in the second configuration, facing the third seat defined by the driving position.

The set of pedals 12 is adjacent to the door sill 23 when it is in the first position. In this first position, a first distance between the set of pedals 12 and the door sill 23 is smaller than a second distance between the set of pedals 12 and the door sill 24. Said first and second distances are measured along the axis Y.

In greater detail, the set of pedals 12 is in a central position between the door sills 23, 24 when it is in the second position. In this second position, the set of pedals 12 is equally spaced apart from the door sills 23, 24 along the axis Y.

In addition, the passenger compartment 3 comprises a connection assembly 30 interposed between the set of pedals 12 and the body 3 and designed to enable the translation of the set of pedals 12 parallel to the axis Y between the first and the second position.

The connection assembly 30, in turn, comprises:
a pair of guides 50, 51 parallel to the axis Y and spaced apart along the axis X, and fixed to the body 3;
a pair of slides 52, 53 parallel to the axis Y and spaced apart along the axis X, fixed to the base 13 of the set of pedals 12 and slidable on respective guides 50, 51 parallel to the axis Y; and
an electric motor 55 carried by the slide 52 and operable to convert, via a transmission assembly 56, the rotation of an output member of the electric motor 55 around the axis Y into the sliding of the slides 52, 53 on the respective guides 50, 51 parallel to the axis Y, and the consequent movement of the set of pedals 12 between the first and the second position.

The guide 50 is arranged in front of the guide 51.
Similarly, the slide 52 is arranged in front of the slide 53.
The guides 50, 51 comprise:
respective first ends adjacent to the longitudinal end door sill 23 of the body 2; and
respective second ends opposite to corresponding first ends and arranged in a central position between the door sills 23, 24 of the body 2.

The slides 51, 52 are arranged at a bottom face 54 of the base 13.

The accelerator pedal 17 and the brake pedal 18 are connected to the base 13 in a position interposed between the slides 51, 52 along the axis Y.

The accelerator pedal 17 and the brake pedal 18 protrude outwards from a top face 65 of the base 13 opposite the face 54.

In particular, the accelerator pedal 17 and the brake pedal 18 protrude outwards from the edge 32 of the base 13.

The transmission assembly 56, in turn, comprises:
- a screw 60 carried by an output member 63 of the motor 55 and capable of rotating around the axis Y; and
- a nut screw 61 carried by the slide 52, constrained to the body 3 so as to be angularly fixed around the axis Y and screwed onto the screw 60 so as to be able to slide around the axis Y following the rotation of the screw 60 around the axis Y.

The motor vehicle 1 further comprises a system for moving the steering wheel 11 parallel to the axis Y, which is not described in detail as it is not part of the present invention.

In a nutshell, the above-mentioned movement system is operable to cause the movement of the steering wheel 11 parallel to the axis Y between:
- a third position (FIGS. 1, 2 and 4) taken on when the passenger compartment 3 is in the first configuration and the set of pedals 12 is in the first position, facing the first seat defined by the location 25; and
- a fourth position (FIGS. 3 and 5) taken on when the passenger compartment 3 is in the second configuration and the set of pedals 12 is in the second position, facing the third seat defined by the location 25.

The steering wheel 11 is adjacent to the door sill 23 when it is in the third position.

The steering wheel 11 is in a central position between the door sills 23, 24 when it is in the fourth position.

The operation of the motor vehicle 1 is described starting from a condition in which the passenger compartment 3 is in the 'two-seater' configuration.

In this 'two-seater' configuration, the location 25 defines the first seat for the driver and the second seat for a passenger arranged side-by-side parallel to the axis Y.

More precisely, the first seat is beside the door sill 23, and the second seat is beside the door sill 24 parallel to the axis Y.

Figure 2:
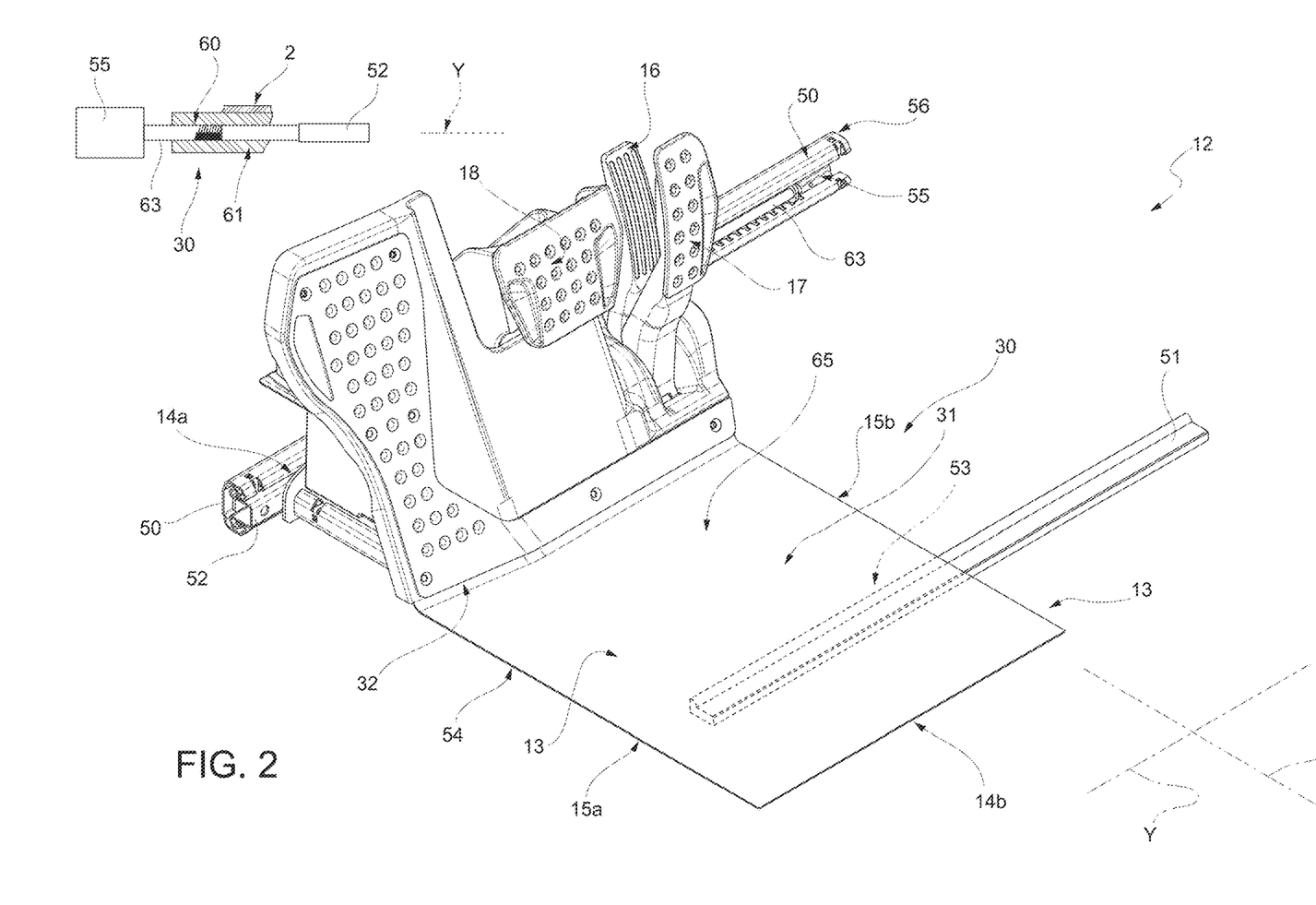
FIGS. 2 and 3 are perspective views, according to a first visual angle, of a set of pedals of the motor vehicle shown in FIG. 1 in a first and in a second operating position, respectively.
Figure 4:
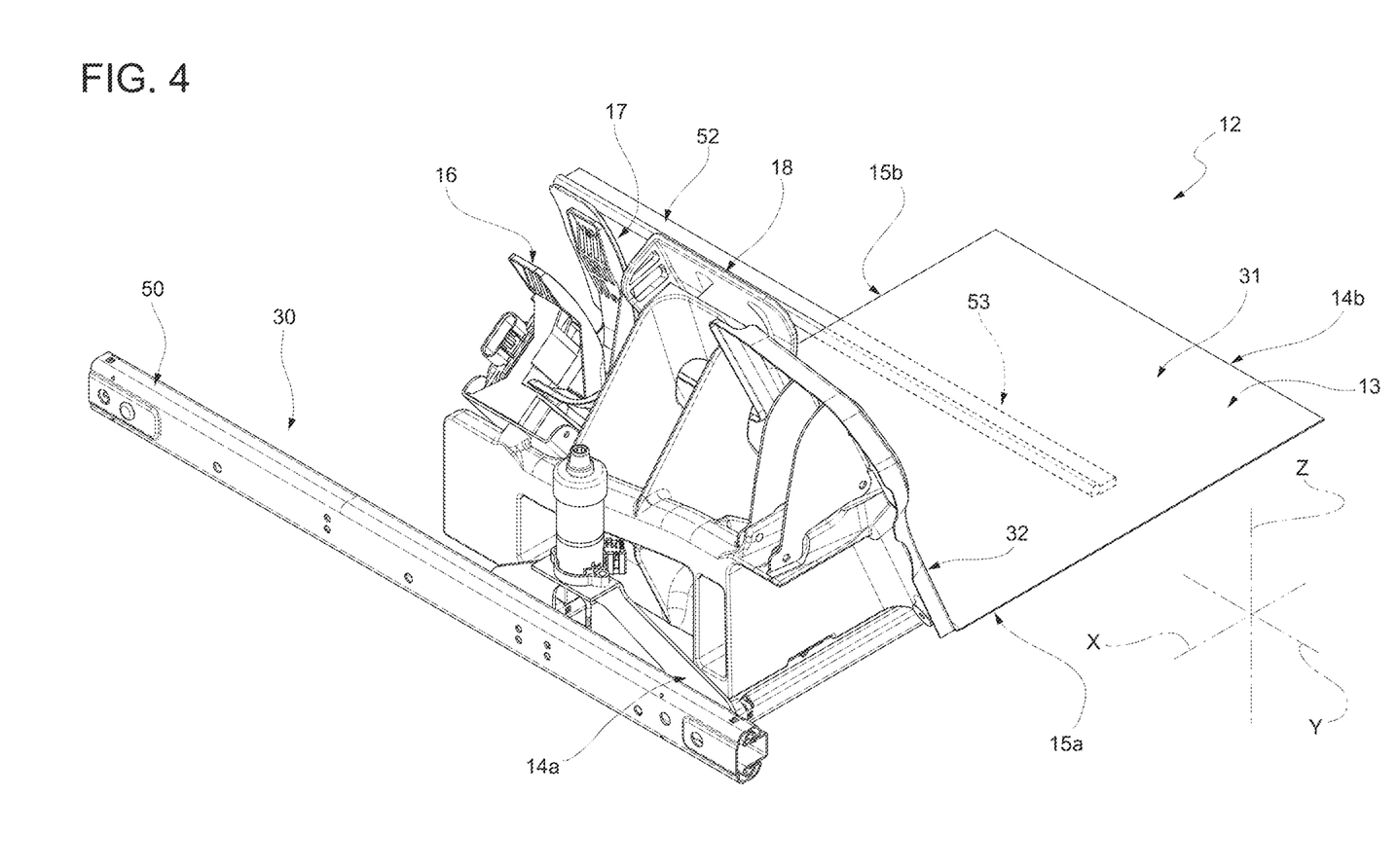
FIG. 4 is a perspective view, according to a second visual angle, of a set of pedals of the motor vehicle shown in FIG. 1 in the first operating position.
Figure 5:
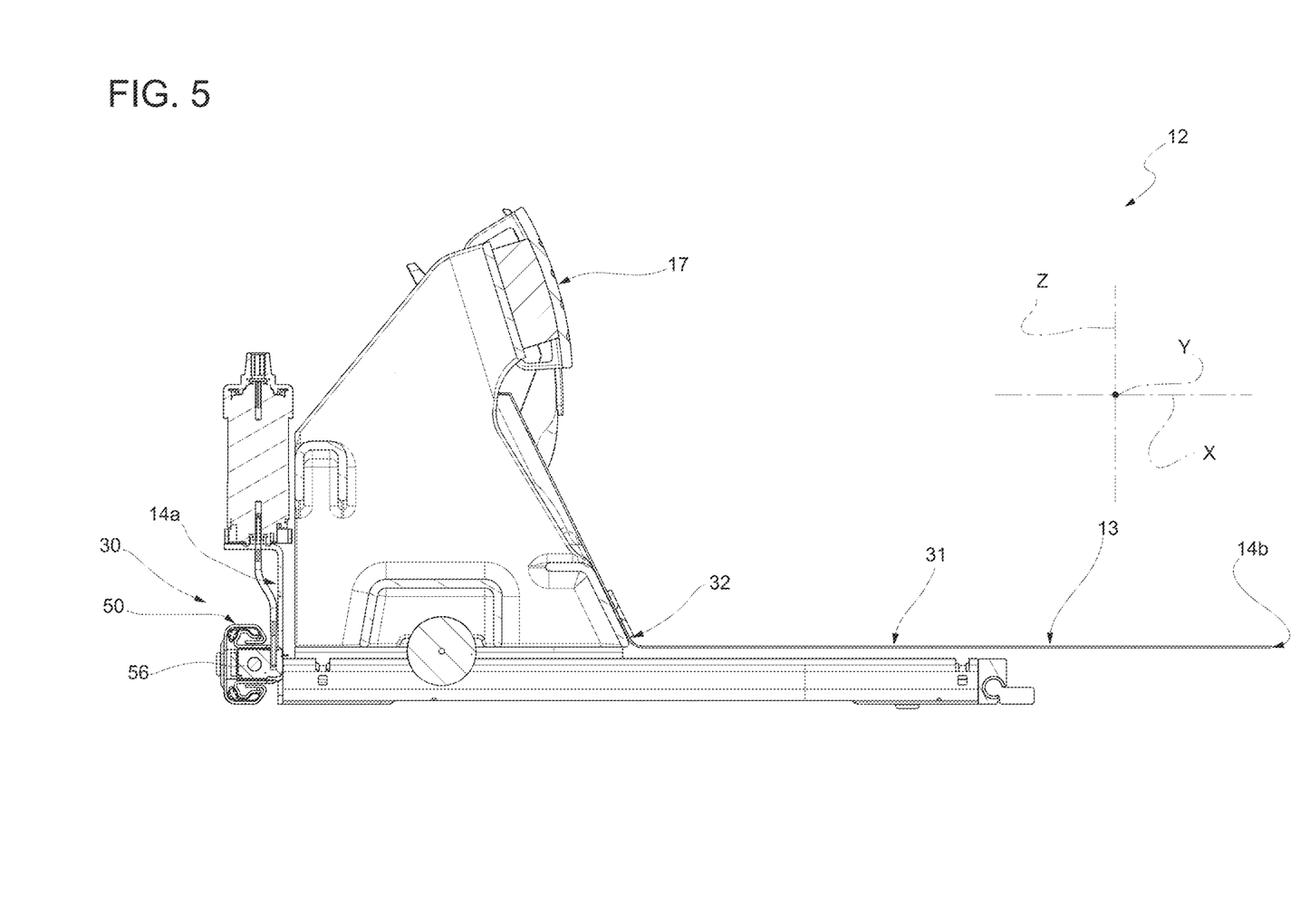
FIG. 5 is a section along the line V-V in FIG. 3.

As shown in FIGS. 1, 2 and 4, the set of pedals 12 and the steering wheel 11 are also arranged in the first and the third position, respectively, in which they face the first seat defined by the location 25 along the axis X.

In addition, the first seat faces the steering wheel 11 and the set of pedals 12 along the axis X to allow the driver to operate the steering wheel 11 and the set of pedals 12 and thus control the forward trajectory and the speed of the motor vehicle 1.

If it is desired to reconfigure the motor vehicle 1 so as to arrange the passenger compartment 3 into the 'single-seater' configuration, it is sufficient to operate the electric motor 55 in a first direction via a dedicated control and under certain operating conditions of the motor vehicle 1.

The operation of the electric motor 55 in the first direction causes the screw 60 to rotate around the axis Y and the consequent translation of the nut screw 61 parallel to the axis Y and in a direction from the door sill 23 to the door sill 24.

The translation of the nut screw 61 causes the sliding of the slides 52, 53 on the respective guides 50, 51 and of the base 13 parallel to the axis Y and in a direction from the door sill 23 to the door sill 24.

Figure 3:
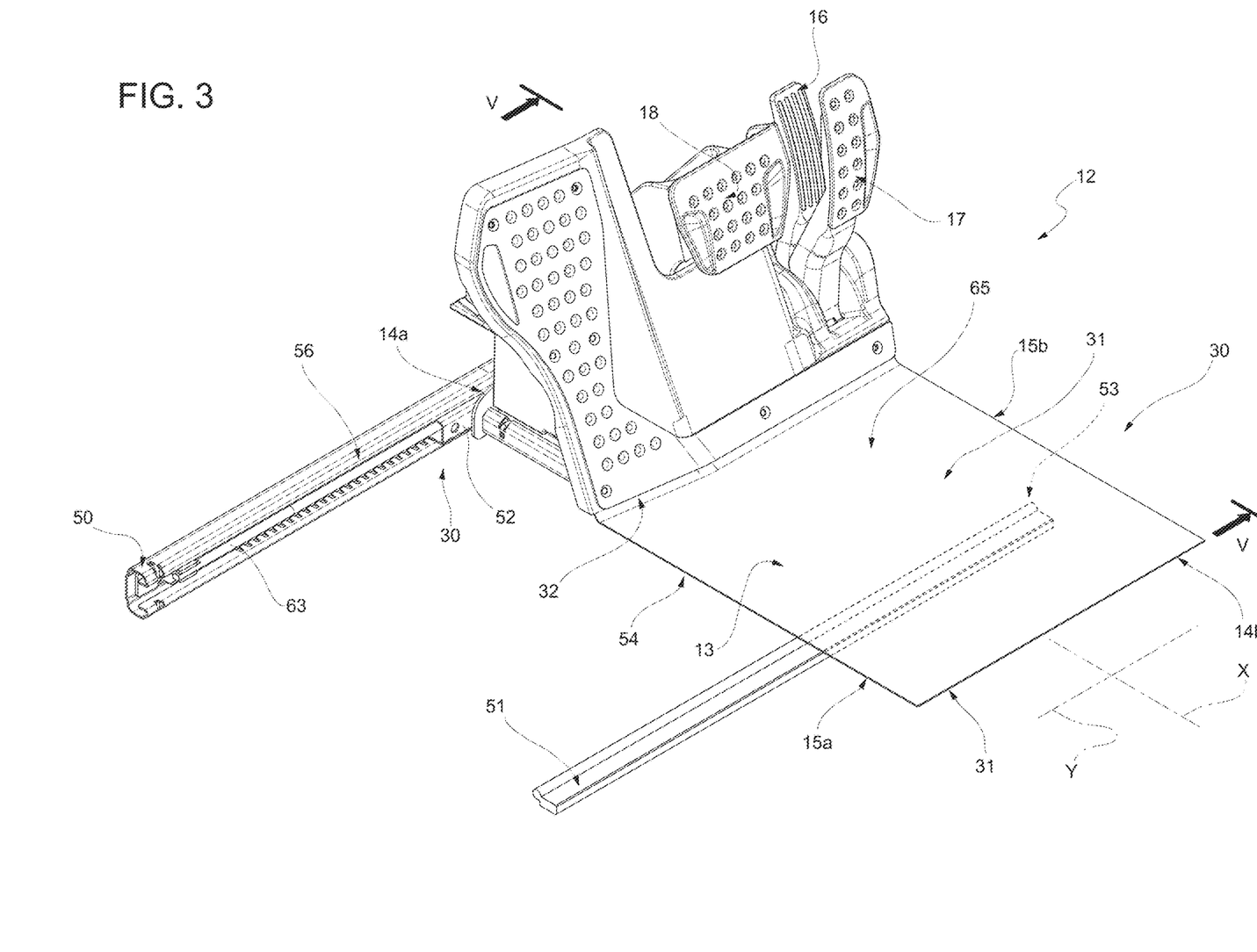

As a result, the set of pedals 12 reaches the second position shown in FIG. 3 in which it faces the third seat defined by the driving position.

More precisely, the set of pedals 12 is in a central position between the door sills 23, 24 when it is in the second position.

The system for moving the steering wheel 11 is operated to cause the movement of the steering wheel 11 parallel to the axis Y until it reaches the fourth position.

The steering wheel 11 is in a central position between the door sills 23, 24 and faces the third position defined by the location 25 when it is in the fourth position.

The location 25 is reconfigured so as to only define the third seat for the driver, which is not necessary for the understanding of the present invention.

The single third seat is arranged in a central position between the door sills 23, 24 and faces the steering wheel 11 and the set of pedals 12.

At this point, the passenger compartment 3 has taken on the 'single-seater' configuration.

The passenger compartment 3 is repositioned from the 'single-seater' configuration to the 'two-seater' configuration by simply operating the electric motor 55 in a second direction opposite the first direction, so as to return the set of pedals 12 to the first position.

Subsequently or simultaneously, the steering wheel 11 is arranged into the third position and the location 25 is reconfigured to define the first seat for the driver and the second seat.

The advantages enabled by the present invention will be apparent from an examination thereof.

In greater detail, the set of pedals 12 can be moved along the axis Y between the first and the second position, so that the passenger compartment 3 can be moved between the 'two-seater' configuration and the 'single-seater' configuration.

In fact, the set of pedals 12 in the first position faces, along the axis X, the first seat for the driver defined by the location 25 adjacent to the door sill 23.

Similarly, the set of pedals 12 in the second position faces, along the axis X, the single third seat for the driver defined by the location 25 in a central position between the door sills 23, 24 along the axis Y.

The motor 55 and the transmission assembly 56 formed by the screw 60 and the nut screw 61 ensure a fast and precise movement of the set of pedals 12 between the above-mentioned first and second positions.

Lastly, it is clear that modifications and variations may be made to the motor vehicle 1 and the reconfiguration method according to the present invention, without however departing from the scope of protection defined by the claims.

In particular, in the 'two-seater' configuration, the first seat could be positioned facing the door sill 24 and the second seat could be positioned facing the door sill 24, thus achieving a right-hand driving mode of the motor vehicle 1.

The invention claimed is:

1. A motor vehicle comprising:
   a passenger compartment;
   a plurality of driving members, which are housed inside said passenger compartment and can be operated by a driver in order to control a trajectory and a speed of said motor vehicle;
   at least one control member connected to at least one driving member of said plurality of driving members through a drive by wire mode;
   said motor vehicle being selectively available in:
   a first configuration, wherein said passenger compartment defines a first seat for a driver facing said at least one control member and a second seat for a passenger beside said first seat along a first axis (Y); and a second configuration, wherein said passenger compartment only defines a third seat for said driver;

said first seat being arranged, in said first configuration, in a first position and the third seat being arranged, in said second configuration, in a second position spaced apart from said first position along said first axis (Y);

wherein said at least one driving member can be moved along said first axis (Y) in order to enable the transformation of said motor vehicle between said first and second configurations;

said at least one driving member being a set of pedals comprising at least:
an accelerator pedal; and
a brake pedal;
a body;
a first guide fixed to said body; and
a first slide fixed to said set of pedals and coupled to said first guide so as to slide relative to said first axis (Y);
wherein said set of pedals comprises a base, to which said brake pedal, said accelerator pedal and said first slide are fixed;
said motor vehicle further comprising:
a second guide fixed to said body in a position spaced apart from said first guide along a second axis (X) orthogonal to said first axis (Y); and
a second slide fixed to said base in a position spaced apart from said first slide along said second axis (X);
said first-brake pedal and said accelerator pedal being fixed to said base in a position interposed between said first and second slides along said second axis (X).

2. The motor vehicle according to claim 1, further comprising:

a motor member fixed to said second slide and comprising, in turn, an output shaft, which can rotate around an axis that is parallel to or coincident with said first axis (Y);

a first threaded element, which is angularly integral with said output shaft; and a second threaded element, which is screwed onto said first threaded element and is constrained so as to be capable of sliding together with said first slide on said first guide, following the rotation of said first threaded element.

3. The motor vehicle according to claim 2, wherein said motor is an electric motor.

4. The motor vehicle according to claim 1, wherein said at least one driving member can be moved between a first position and a second position, which are spaced apart from one another along said first axis (Y);

said body comprising a first door sill and a second door sill extending along said second axis (X), which is parallel, in use, to a normal driving direction of said motor vehicle and is transversal to said first axis (Y);

said first door sill and said second door sill being spaced apart from one another along said first axis (Y);

said at least one driving member being arranged, in said first position, adjacent to said first door sill and at a first distance from said first door sill which is smaller than a second distance from said second door sill; said first and second distances being measured along said first axis (Y);

said at least one driving member being arranged, in said second position, in a position equally spaced apart from said first and second door sills along said first axis (Y).

* * * * *